June 4, 1946.  R. B. PEALER  2,401,659
ABRASIVE CUT-OFF MACHINE
Filed Aug. 2, 1944  5 Sheets-Sheet 4
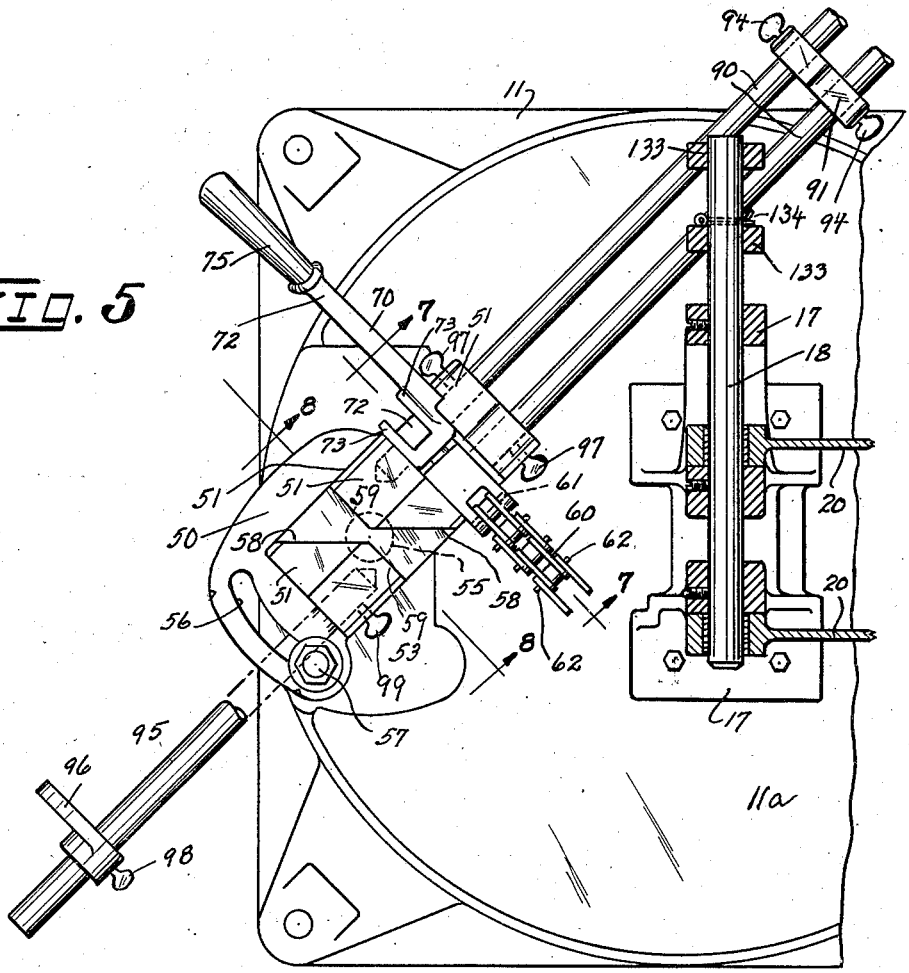
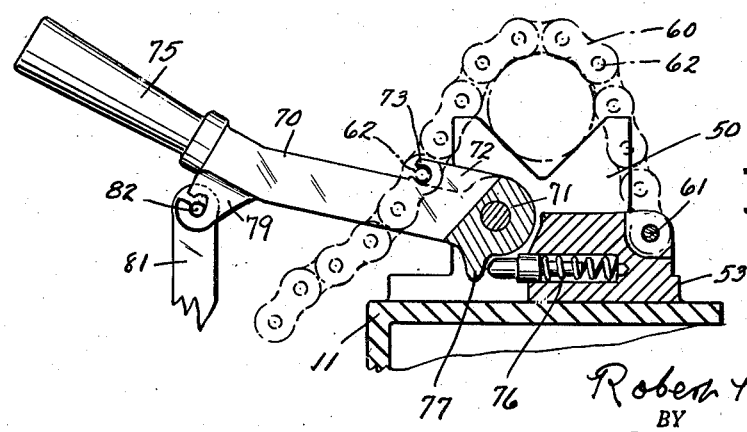
INVENTOR.
Robert B. Pealer
BY
Bates, Teare & McBean
Attorneys June 4, 1946. R. B. PEALER 2,401,659
ABRASIVE CUT-OFF MACHINE
Filed Aug. 2, 1944 5 Sheets-Sheet 5
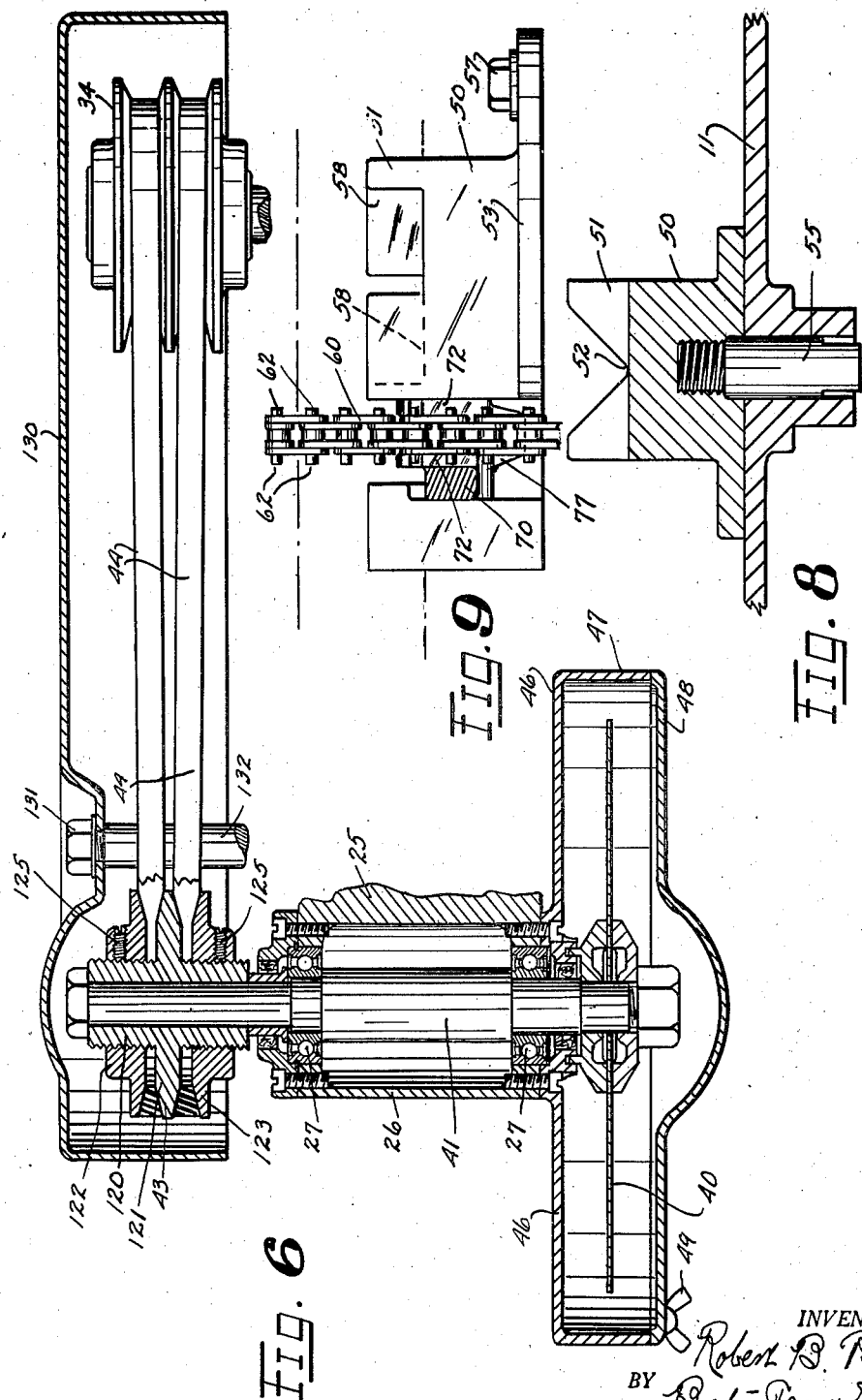
INVENTOR.
Robert B. Pealer,
BY Bates, Pearr & McBean
Attorneys.

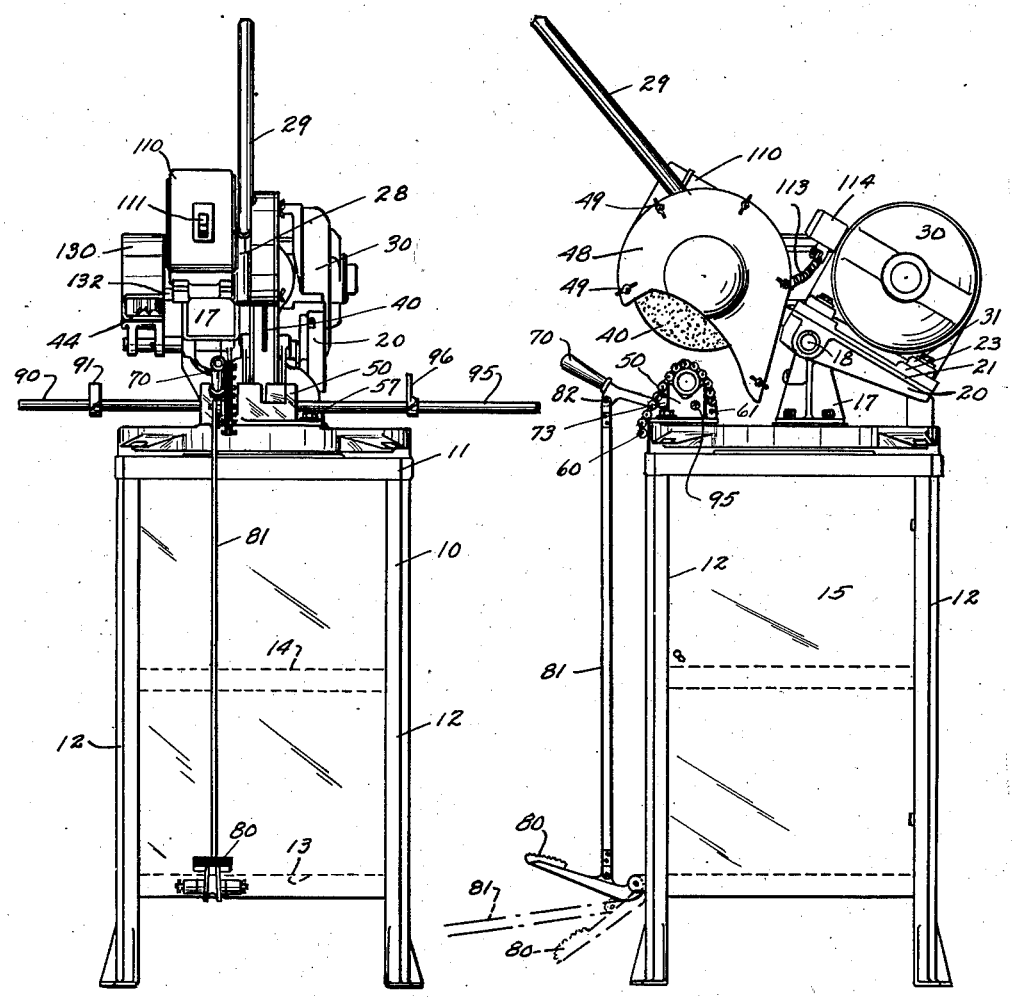

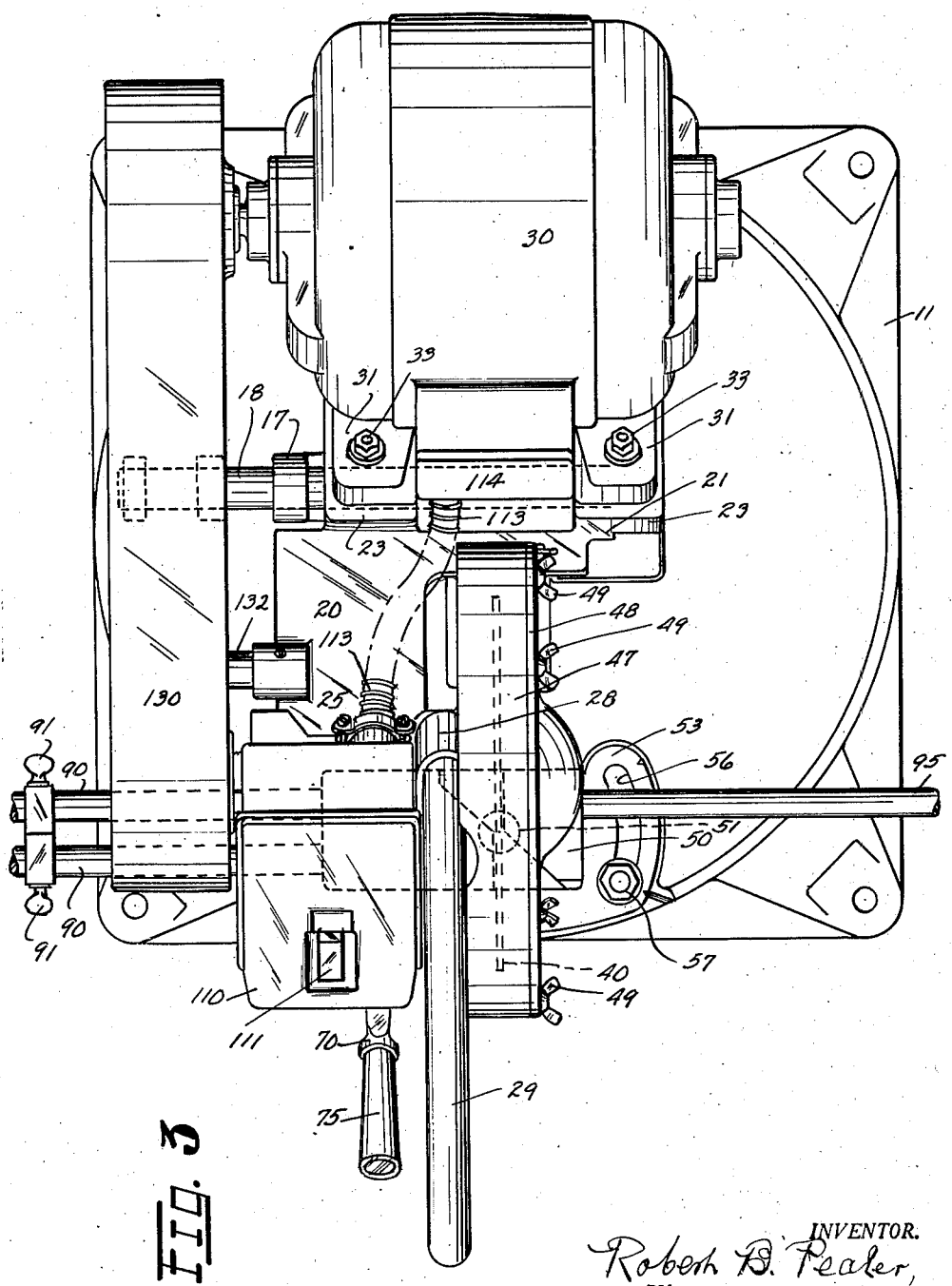

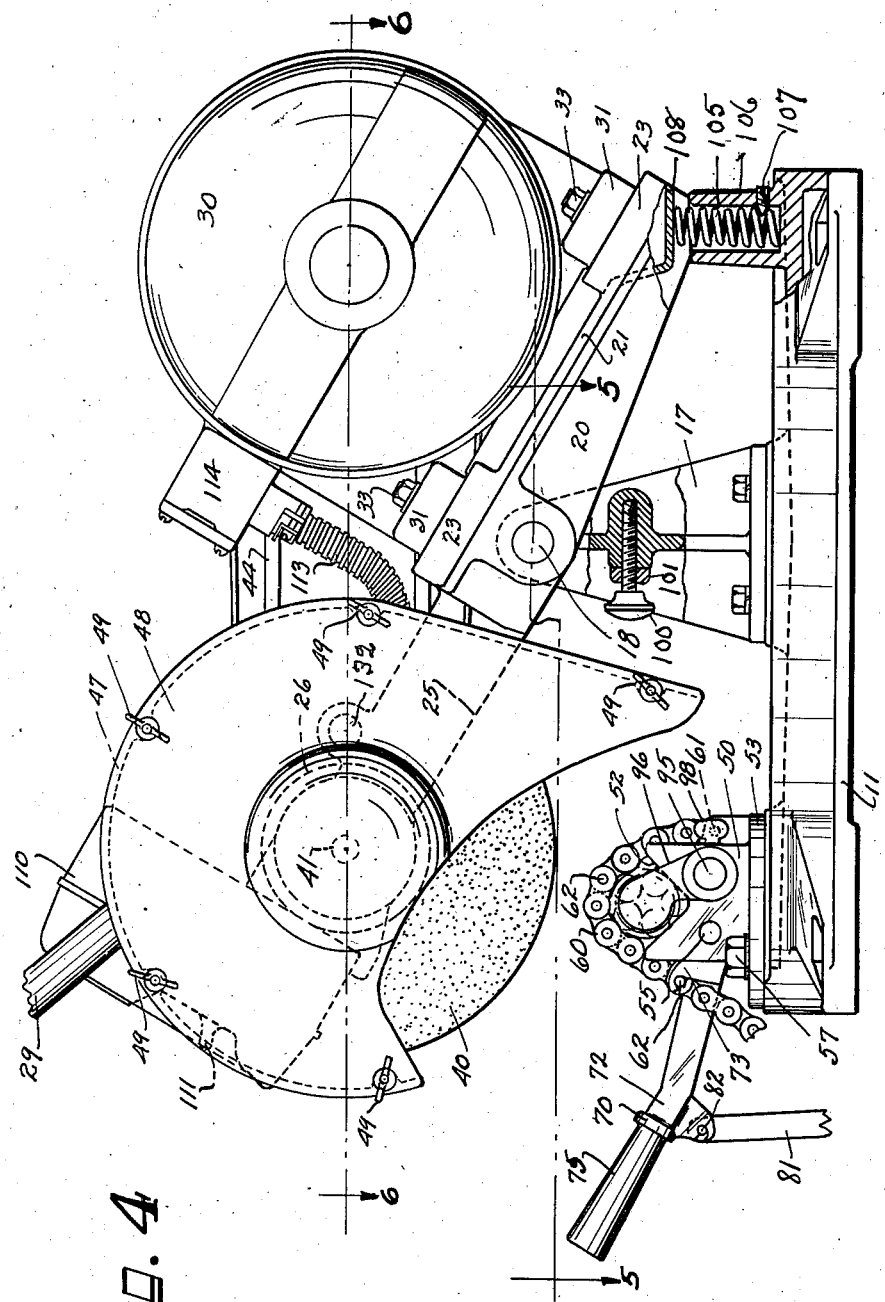

Patented June 4, 1946

2,401,659

UNITED STATES PATENT OFFICE 2,401,659

ABRASIVE CUTOFF MACHINE

Robert B. Pealer, Garrettsville, Ohio, assignor to Beaver Pipe Tools, Inc., Warren, Ohio, a corporation of Ohio Application August 2, 1944, Serial No. 547,681

6 Claims. (Cl. 51—98)

This invention relates to a cut-off machine of the type having means for positioning the work, a motor driven rotating abrasive disc and means for bringing the disc into engagement with the work. A general object of the invention is to provide such a machine in an efficient and durable form.

More particularly, it is an object of the invention to provide simple and effective means for clamping the work when properly located whether the work comprises one article or a number of articles to be cut at the same operation. It is also an object to properly gauge the work and to support it beyond the clamp.

Another object of the invention is to provide means enabling the cutting at a readily selected oblique angle to the axis of the article. Another object of the invention is to provide for readily changing the speed of rotation of the cutting disc, to enable proper peripheral speed to be maintained, notwithstanding material reduction in diameter of the disc due to wear.

The above outlined features and others contributing to the efficiency of the complete machine will be apparent from the following description of a preferred embodiment shown in the drawings.

In the drawings, Fig. 1 is a front elevation of the complete machine; Fig. 2 is a side elevation thereof; Fig. 3 is a plan of the machine on an enlarged scale; Fig. 4 is a side elevation of the upper part of the machine on the same scale as Fig. 3, certain parts being broken away to illustrate the internal construction; Fig. 5 is a horizontal section on an offset plane indicated by the line 5—5 on Fig. 4, showing the work support turned to a 45° position; Fig. 6 is a horizontal section in a plane indicated by the line 6—6 on Fig. 4; Fig. 7 is a sectional detail through the work clamp, indicated by the line 7—7 on Fig. 5; Fig. 8 is a sectional detail through the pivot of the work support, indicated by the line 8—8 on Fig. 5; Fig. 9 is a front elevation of the work holder and clamp removed from the machine.

In general, as shown in Figs. 1 and 2, 10 indicates a frame or stand of the machine; 20 an intermediately pivoted frame carried by the stand and supporting at the rear of its pivot the driving motor 30 and at the front of the pivot the driven disc 40; 50 indicates a support for the work; 60 a clamping chain cooperating with the work support; and 70 and 80 operating mechanism for the clamp, operable by hand or a foot treadle as desired.

The stand 10 is shown as having a rectangular top 11 providing a table (preferably having a circular top surface 11a, Fig. 5) and four supporting legs 12 suitably braced by cross members, for instance, lower cross members 13 and intermediate members 14. If desired, the cross members may carry suitable shelves and the vertical space between the legs may be closed and suitable door indicated at 15 provided on one side, so that the frame becomes a cabinet adapted to be closed and locked.

Secured to the top of the table 11 is a bifurcated standard 17 to which is mounted a cross shaft 18 by which the rocking frame 20 is supported. This frame has a substantially flat rectangular top portion 21, partially above the pivot and extending to the rear thereof, on which the motor is mounted. The motor 30 is shown as having feet 31 resting on suitable pads 23 on the top of the rocking frame, bolts 33 passing through such ears and pads holding the motor firmly on the rocking frame.

At the front of the pivot 18 the rocking frame extends frowardly as an arm 25, the forward end of which is formed into a cylindrical loop 26 in which is mounted an anti-friction bearing 27 (Fig. 6) for the shaft 41 of the abrasive disc 40. The shaft 41 journalled in the anti-friction bearing 27 carries at one end on one side of the arm 25 the abrasive disc 40 and on the other side a pulley 43 (hereinafter described in detail) which is connected by a belt 44 with a pulley 34 on the armature shaft of the motor.

Formed on the top of the loop 26 of the rocking arm is a socket 28 inclined upwardly toward the front of the machine and adapted to receive an operating handle 29 which is shown as threaded in the socket. By means of this handle the rocking frame may be swung to move the rotating disc downwardly into engagement with the work in the clamp, as hereinafter described.

The arm 25 of the rocking frame also carries a suitable guard for the disc. This comprises a fixed plate-like portion 46 on one side of the disc, a boundary portion 47 carried thereby and extending over the top, the rear, and part of the front of the disc, and a removable plate 48 secured to the boundary flange 47 completing the guard. By unscrewing wing nuts 49 on threaded studs carried by the boundary flange 47 the cover plate 48 may be removed to allow access to the disc mounting, to enable the disc to be removed and replaced as desired. When the guard cover is in place only a comparatively small portion of the disc, in the lower front region thereof, is exposed, as shown in Fig. 2.

The clamp 50 which holds the work to be engaged by the disc comprises a block 51 having a V-shaped longitudinal notch 52 in its top and having an extended base in the form of a plate-like portion 53. The block with its base is pivoted to the table 11 by a downwardly extending stud 55 on the base, socketed in an opening in the table, as shown in Fig. 8. The axis of this stud is directly beneath disc 40. The block base 53 is shown as extending to the right hand side of the block and is provided with an arcuate slot 56 (Figs. 3 and 5) curved about the axis of the stud 55. A bolt 57 carried by the table 11 extends through this slot and a nut on the bolt operates to clamp the block base in any desired position within the range of the slot 56.

I prefer to make the slot 56 long enough so that the block 50 may be turned 45° from its normal position. The V-shaped top of the block is cut away sufficiently to receive the lower portion of the disc as it is lowered through the work irrespective of the position of the block. The space provided is preferably in the form best shown in Fig. 5, and is comparatively narrow in the central region, while on opposite sides of the central region the space flares toward the rear and toward the front therefrom, being bounded on one side by a vertical surface 58 at 45° to the longitudinal axis of the block and on the other side by a vertical surface 59 at 90° to such axis.

It will be seen that the space provided for by the disc in the front of the block has a flat wall close to the left hand face of the disc and a 45° flare on the right hand side, while at the rear the straight wall is on the right hand side and the flared wall at the left hand side of the disc. This provides for an effective support of the work close to the disc and still allows the swinging of the supporting block as desired to enable the work to be cut-off at an angle.

Suitably pivoted to the rear of the block 50 is a chain 60, shown as secured at its lower end to the block by a pin 61 and adapted to extend over the work. This chain is composed of a series of links connected by pins 62 which project to each side of the chain. 70 indicates a hand lever pivoted at 71 to the block 50 and extending along one side of the forward portion of the chain. On the other side of the chain this lever has an arm 72, and both the arm and the lever proper are formed at the front with hooks 73 adapted to engage pin projections on the chain, whereby the lever may tension the chain. The chain is normally free from the hand lever and lies on the table 11 at the rear of the block. After the work has been positioned in the block, the free portion of the chain is brought over across the top of the work to the front and latched beneath the hooks 73. This enables the operator by grasping the handle 75 on the forward end of the lever 70 to pull the chain tightly around the work, clamping it in the V-groove of the block, this clamping being effective for a single article or several articles as desired, as indicated for instance in Fig. 4.

The hand lever 70 is normally maintained substantially in the position shown in Fig. 2 by a spring 76 (Fig. 7) in the base of the block 50, pressing forwardly against an ear 77 depending from the lever. The uppermost position of the lever is determined by the engagement of the rear face of the lever part 72 with the forward face of the block.

It will be seen that the hand lever and chain construction described enables the operator readily to clamp and hold the work with his left hand while his right hand is free to engage and operate the lever 29 to lower the disc to cause its cutting operation. It is sometimes desired, however, to effect the clamping by treadle action so that the operator may have his left hand free for positioning of the work to be clamped. To enable this, I provide a treadle 80 suitably pivoted to the stand (shown as pivoted to one of the lower cross members 13) and connected by a link 81 to the hand lever 70.

The connection of the link 81 to the hand lever is removable, preferably made by bifurcating the upper end of the link and providing it with a pin 82 (Figs. 4 and 7) which may occupy a hooked recess in a downwardly projecting ear 79 on the lever. Whenever desired, the pin 82 may be withdrawn from the recess to disconnect the treadle from the hand lever. Preferably the mouth to the recess is very slightly smaller than the diameter of the pin 82 so that some force is required to insert the pin into the recess or remove it therefrom, thus preventing accidental disconnection.

In the form shown, the operator has the option of using either the handle 75 or the treadle 80 for effecting the clamping whenever the cutting is to be at right angles to the axis of the work, as occurs most of the time. When the operator desires the cutting to be oblique to the axis, and wishes to set the block accordingly, he disconnects the link 81 from the hand lever, simply giving the upper end of it a jerk to pull the pin out of the lever recess, and allows the treadle to drop to the floor and the link to rest on the floor or against the front of the stand and then uses the hand lever to effect the clamping.

It is frequently desirable to support the work outside of the region of the block 50, especially when a comparatively long article is being cut, and to enable this I provide the support shown at the left of the block in Figs. 1 and 5. This support comprises a pair of parallel rods 90 secured to the block and extending toward the left and a suitable rest 91 having a V-shaped top aligning with that of the block 50 and movably clamped on the rods by thumb screws 94. The rest may thus be shifted in or out according to the length of the work to be supported.

On the other side of the block I mount in it a rod 95 on which is adjustably mounted a gauge block 96 clamped by a thumb screw 98 and forming a stop for that end of the work. The rods for the work rest and gauge are removably mounted in the block 50, being normally clamped therein by thumb screws 97, 99.

To limit the lowermost position which the disc may occupy, so that it cannot cut below the V-groove in the block 50, I provide a suitable adjustable stop. As shown in Fig. 4, this stop comprises the head on a screw 100 mounted in the standard 17 in position to engage the wall 41 of the disc guard. A suitable jam nut 101 is shown as locking this screw. As the disc becomes reduced in diameter due to wear, this bumper may be adjusted away from the guard to allow further downward movement to the disc.

The weight of the motor and other parts back of the pivot 18 is greater than that in front of the pivot, so that the parts normally stand in the position shown in Figs. 2 and 4. I provide a shock absorber to receive the blow when the parts are returned to this position after the cutting has been effected. This shock absorber is shown in Fig. 4 as comprising a spring 105 mounted in an upstanding socket 106 formed on the table 11, the spring being shown as locked in place by a set screw 107. The rocking frame 20 carries on its under-face a plate 108 adapted to engage the top of the spring when the parts are returned to standing position. This provision of a shock absorber enables the operator at the conclusion of the cutting operation to merely release his hold on the handle 29 and allow the parts to return by gravity to standing position.

It is desirable to have the starting switch for the motor readily accessible for the operator's hand as he engages the operating lever 29. For this purpose I mount the switch in a housing 110 carried by the arm 25. The finger lever 111 of the switch projects forwardly from the housing. The conductors from this switch extend through a flexible cable 113 to a terminal boss 114 housing the motor terminals.

A change-speed connection between the motor shaft and disc shaft, which enables the proper peripheral speed to be maintained for the disc notwithstanding its wear, is provided. As shown in Fig. 6, it comprises V-pulleys (designated 43 as a whole) of adjustable effective diameter mounted on the shaft 41 and connected by V-belts 44 with adjustable double V-pulleys 34 on the armature shaft.

The adjustable pulley 43 is shown in section in Fig. 6, and the pulley 34 is similarly formed. Each pulley comprises a hub 120 mounted on the shaft and having in its central region a projecting annular portion 121 tapered adjacent its periphery, and on each side of this annular portion the hub is threaded and carries a movable annular member 122 and 123, the annular portion of which is chamfered opposite the taper on the central portion. By rotating the annular members in one direction or the other, the corresponding V-groove provided by the pulley may be widened to reduce its effective diameter or narrowed to increase its effective diameter, one pulley being reduced as the other is enlarged, and vice versa. The movable members are locked in their set position by set screws 125 extending through bosses on the annular members and engaging the hub of the threaded member.

The driving and driven pulleys and their belts are housed by a trough-shaped guard 130 which is suitably supported by rocking frame 20 and extends across the top, the far side, the bottom, and the front and rear of the belts and pulleys. As shown, this guard is supported by a pin 132 extending from the arm 25 and by a prolongation of the shaft 18 embraced by ears 133 (Fig. 5) on the guard. The removal of this guard, to provide access to the belts and pulleys is readily effected by taking off the nut 131 from the supporting pin 132 and removing the cotter pin 134 from the shaft 18.

It will be seen from the drawings and the description given that the moving parts of my machine are well guarded so that there is little danger of injury to the operator, while access to such parts may be readily effected whenever needed. The electric switch is located conveniently to the operating handle and may be thrown on or off by the operator's thumb as he grasps the handle. The work is effectively supported in accurate position and the amount to be cut off may be accurately determined by the gauge, and the clamping chain is quickly applied and readily drawn taut over the work by hand or foot pressure, as desired.

I claim:

1. In a cut-off machine, the combination with a cutting disc adapted to be moved to the work, of a work support, a chain adapted to extend over the work on the support, and a hand lever and a foot treadle both removably connected to the chain and either adapted to tension it about the work.

2. In a cut-off machine, the combination with a cutting disc adapted to be moved to the work, of a support for the work, a chain attached at the rear of the support and adapted to overlie the work and depend in front of it, a forwardly projecting hand lever provided with means for its removable connection to the chain at various regions thereof, a foot treadle, and means for connecting it to the hand lever.

3. In a cut-off machine, the combination with a cutting disc adapted to be lowered to the work, a block having a V-shaped top in which the work may be seated, a chain pivotally connected to the rear of the block and adapted to overlie the work and depend in front thereof, a forwardly projecting hand lever pivoted to the block and adapted to be attached to the chain at various points thereof, and a spring tending to maintain the hand lever elevated.

4. In a cut-off machine, the combination with a cutting disc of a work holder adapted to support the work having a recess into which the disc may move, a chain anchored at the rear of the work holder and adapted to extend over the work and depend in front thereof, a hand lever pivotally carried by the machine and extending alongside of the chain and provided with means to hook over projections on the chain, a foot treadle and a link connected at its lower end to the foot treadle and at its upper end removably connected to the hand lever.

5. In a cut-off machine, the combination with a cutting disc of a block adapted to support the work, a chain anchored below and at the rear of work seated in the block and adapted to extend over the work and depend at the front thereof, said chain being composed of overlapping links connected by pins projecting to each side of the chain, and a hand lever extending from its pivot alongside of the chain in front of the machine, and having a side extension lying on the other side of the chain, the lever and side extension being formed with hooks adapted to engage projecting ends of a pin of the chain.

6. In a cut-off machine, the combination with a cutting disc adapted to move into coaction with the work, a block having a seat on its upper face adapted to support the work, a clamp for holding the work on the block, a pair of parallel rods removably carried by the block and extending to one side thereof, and a rest adjustably mounted on the rods and having a seat on its upper surface aligned with that of the block.

ROBERT B. PEALER.